(12) United States Patent
Krisko et al.

(10) Patent No.: US 6,604,486 B1
(45) Date of Patent: Aug. 12, 2003

(54) RESTRICTION INDICATOR

(75) Inventors: William J. Krisko, Bloomington, MN (US); William E. Couillard, Rosemount, MN (US); Robert W. Diver, Rosemount, MN (US); Wayne A. Kaul, Inver Grove Heights, MN (US); Bernard A. Matthys, Apple Valley, MN (US); Larry R. Nepsund, Savage, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/048,689

(22) PCT Filed: Aug. 15, 2000

(86) PCT No.: PCT/US00/22014
§ 371 (c)(1),
(2), (4) Date: Jan. 31, 2002

(87) PCT Pub. No.: WO01/12974
PCT Pub. Date: Feb. 22, 2001

Related U.S. Application Data

(63) Continuation-in-part of application No. 09/375,060, filed on Aug. 16, 1999, now abandoned.
(60) Provisional application No. 60/197,156, filed on Apr. 12, 2000.

(51) Int. Cl.[7] .............................................. G01L 23/00
(52) U.S. Cl. ............................... 116/268; 116/DIG. 25; 116/273; 116/272
(58) Field of Search ................................ 116/266, 268, 116/272, 273, DIG. 7, DIG. 25, 70; 73/49.7

(56) References Cited

U.S. PATENT DOCUMENTS

| | | |
|---|---|---|
| 1,176,338 A | 3/1916 | Bromberg |
| 1,874,913 A | 8/1932 | Crowley |

(List continued on next page.)

FOREIGN PATENT DOCUMENTS

| | | |
|---|---|---|
| DE | 26 17 972 | 4/1976 |
| DE | 25 50 162 | 5/1977 |

(List continued on next page.)

*Primary Examiner*—Diego Gutierrez
*Assistant Examiner*—Travis Reis
(74) *Attorney, Agent, or Firm*—Merchant & Gould P.C.

(57) ABSTRACT

The present disclosure relates to a restriction indicator for an air cleaner system of an internal combustion engine. The restriction indicator includes a housing divided into first and second chambers by a diaphragm. A signal member is connected to the diaphragm. The signal member is moveable along an axis between a reset position and a first indicator position, and defines an axial opening within which a first retaining shoulder is located. A guide member is provided for guiding the signal member as the signal member is moved between the reset position and the first axial position. A retaining member is provided for retaining the signal member in the first indicator position. The retaining member extends within the axial opening of the signal member and includes at least two fingers that project radially outward from the axis. The fingers are configured to engage the first retaining shoulder to retain the signal member in the first indicator position. The restriction indicator further includes a reset button for deflecting the fingers radially inward to disengage the fingers from the first retaining shoulder thereby allowing the signal member to be returned to the reset position. The reset button includes a portion that extends within the axial opening of the signal member between the retaining member and the signal member.

18 Claims, 19 Drawing Sheets

U.S. PATENT DOCUMENTS

| | | | |
|---|---|---|---|
| 3,066,527 A | 12/1962 | Stein et al. | |
| 3,068,831 A | 12/1962 | Witchell et al. | |
| 3,258,960 A | 7/1966 | Baden et al. | |
| 3,283,584 A | 11/1966 | Coffing | |
| 3,335,694 A | 8/1967 | Dwyer et al. | |
| 3,443,365 A | 5/1969 | Lee et al. | |
| 3,465,707 A | 9/1969 | Kashiwaba | |
| 3,916,817 A | 11/1975 | Kemp | |
| 3,939,457 A | 2/1976 | Nelson | |
| 3,963,891 A | 6/1976 | De Magondeaux | |
| 4,014,209 A | 3/1977 | Emerick | |
| 4,020,783 A | 5/1977 | Anderson et al. | |
| 4,029,041 A * | 6/1977 | Genshpring et al. | 116/70 |
| 4,031,847 A | 6/1977 | Sullivan | |
| 4,033,733 A | 7/1977 | Nelson | |
| 4,060,050 A | 11/1977 | Simonsson | |
| 4,116,156 A | 9/1978 | Draxler | |
| 4,153,003 A | 5/1979 | Willis | |
| 4,162,660 A | 7/1979 | Albertson et al. | |
| 4,184,376 A | 1/1980 | Thomas et al. | |
| 4,189,707 A | 2/1980 | Ermert | |
| 4,189,724 A | 2/1980 | Onuma et al. | |
| 4,193,292 A | 3/1980 | Simonsson | |
| 4,254,731 A | 3/1981 | Taylor | |
| 4,365,582 A | 12/1982 | Boyer et al. | |
| 4,369,728 A | 1/1983 | Nelson | |
| 4,445,456 A | 5/1984 | Nelson | |
| 4,445,457 A | 5/1984 | Bargman | |
| 4,651,670 A | 3/1987 | Silverwater | |
| 4,688,511 A | 8/1987 | Gerlach et al. | |
| 5,188,728 A | 2/1993 | Traonvoez et al. | |
| 5,351,035 A | 9/1994 | Chrisco | |
| 5,606,311 A | 2/1997 | Polidan et al. | |
| 5,774,056 A * | 6/1998 | Berry, III et al. | 116/268 |
| 6,026,539 A * | 2/2000 | Muow et al. | 116/268 |
| 6,161,417 A | 12/2000 | Nepsund | |
| 6,307,466 B1 * | 10/2001 | Ferris | 116/268 |
| 6,327,902 B1 * | 12/2001 | Berry, III et al. | 116/268 |

FOREIGN PATENT DOCUMENTS

| | | |
|---|---|---|
| FR | 2 141 993 | 1/1973 |
| FR | 2 298 097 | 1/1975 |
| FR | 2 338 395 | 1/1976 |
| FR | 2 568 484 | 7/1985 |
| WO | WO 97/06363 | 2/1997 |
| WO | WO 99/25974 | 5/1999 |

* cited by examiner

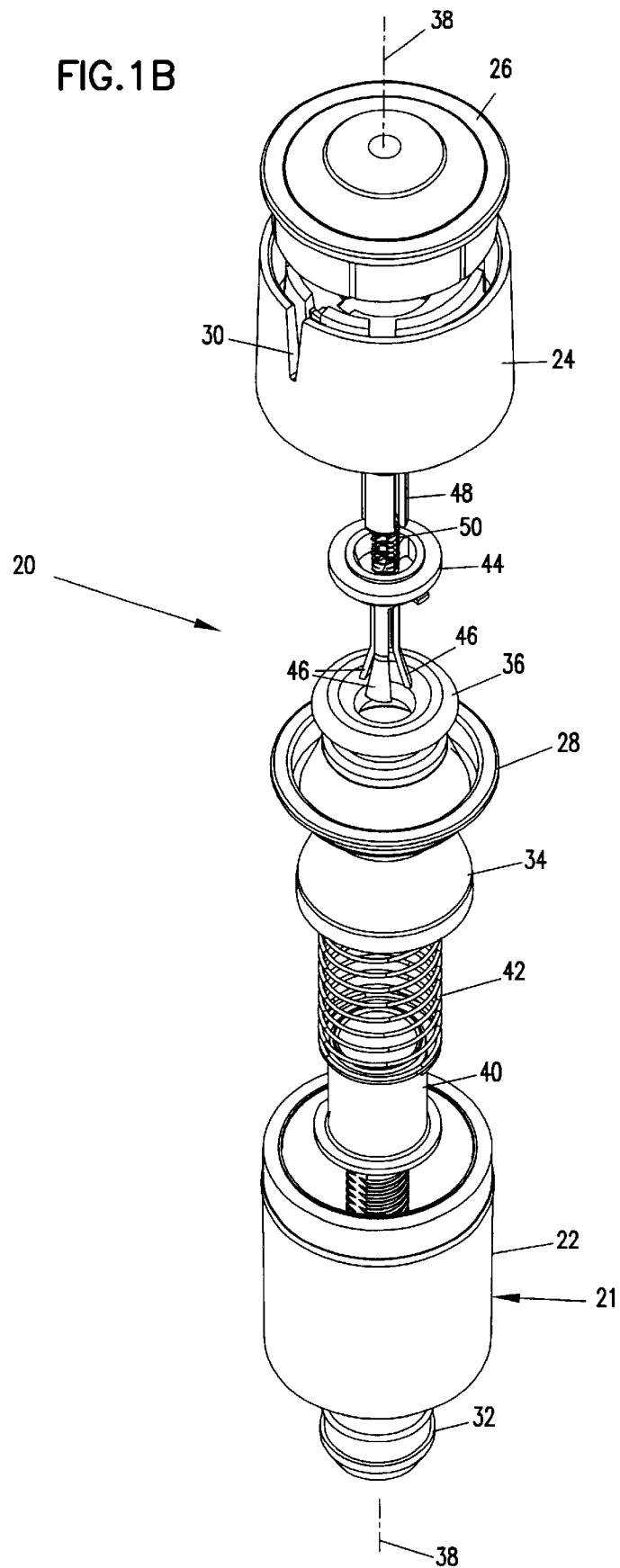

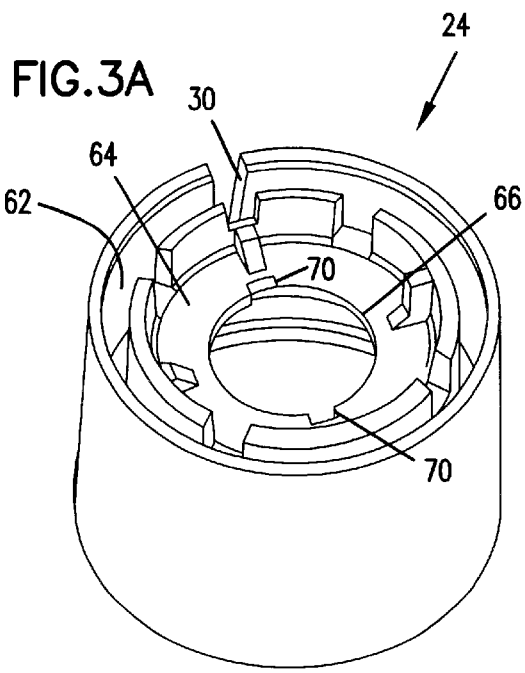
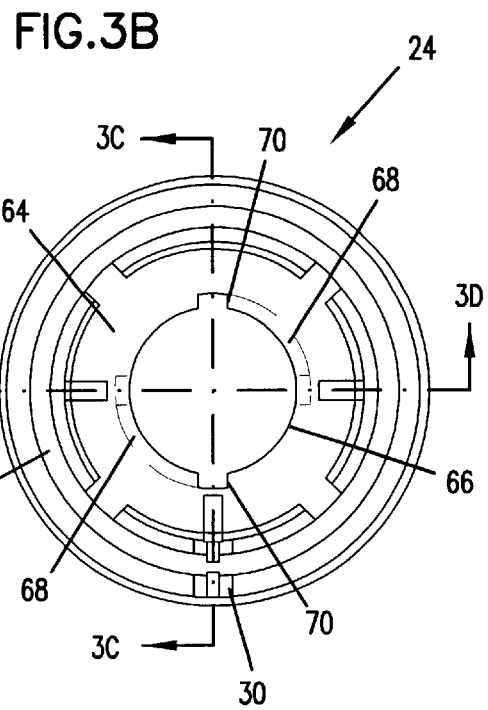
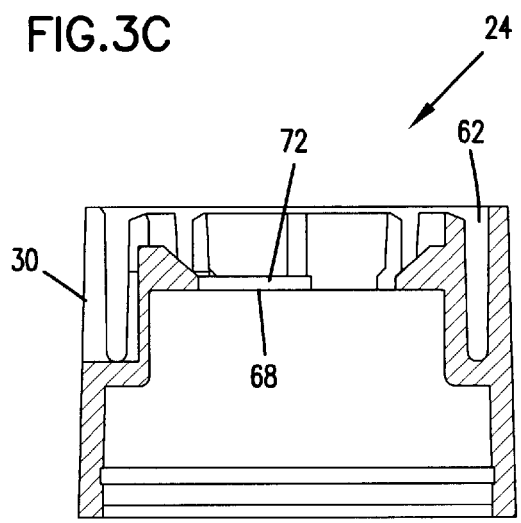
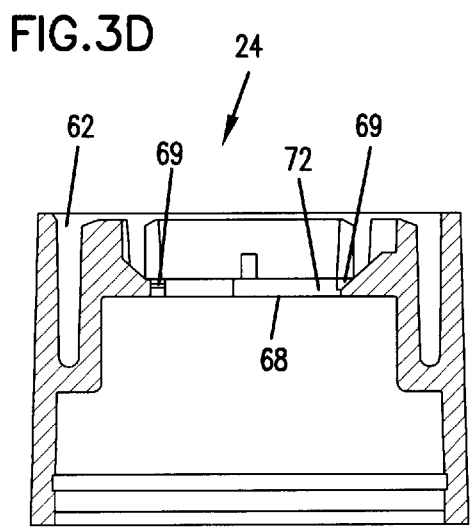

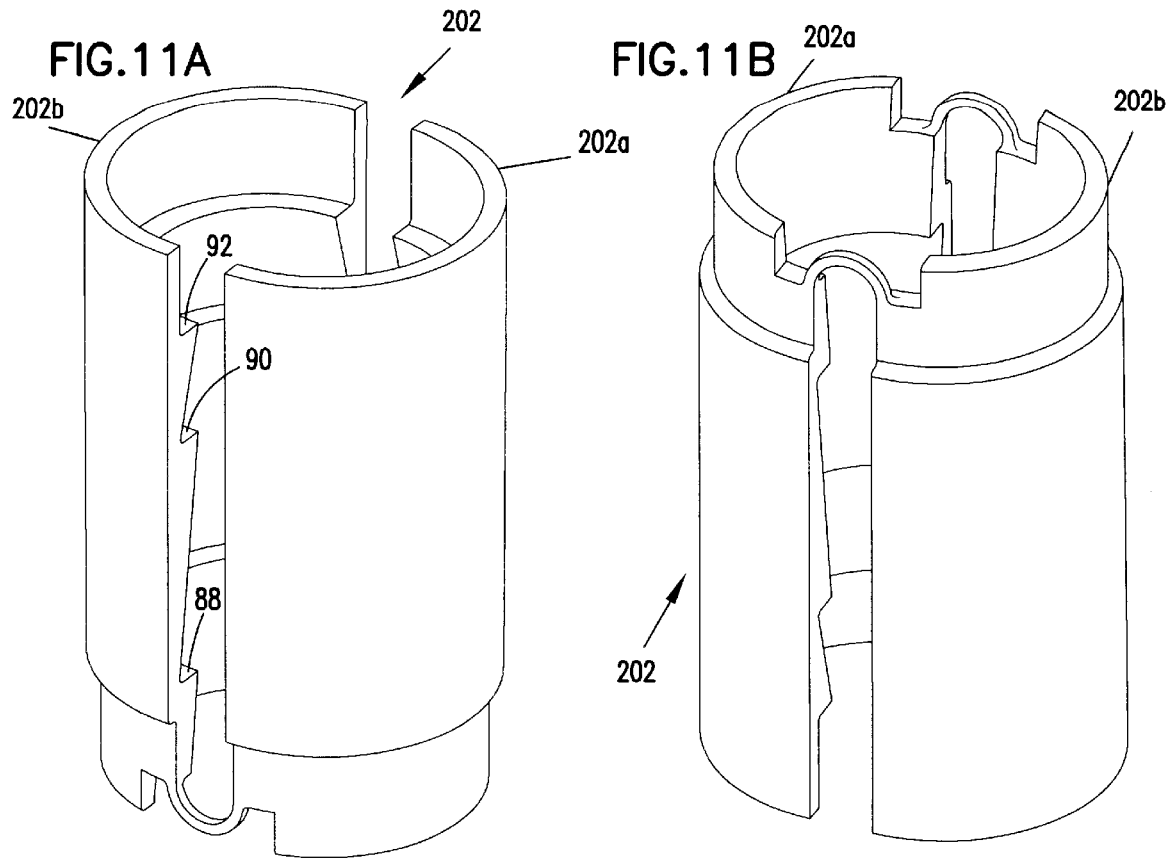
FIG.11A
FIG.11B
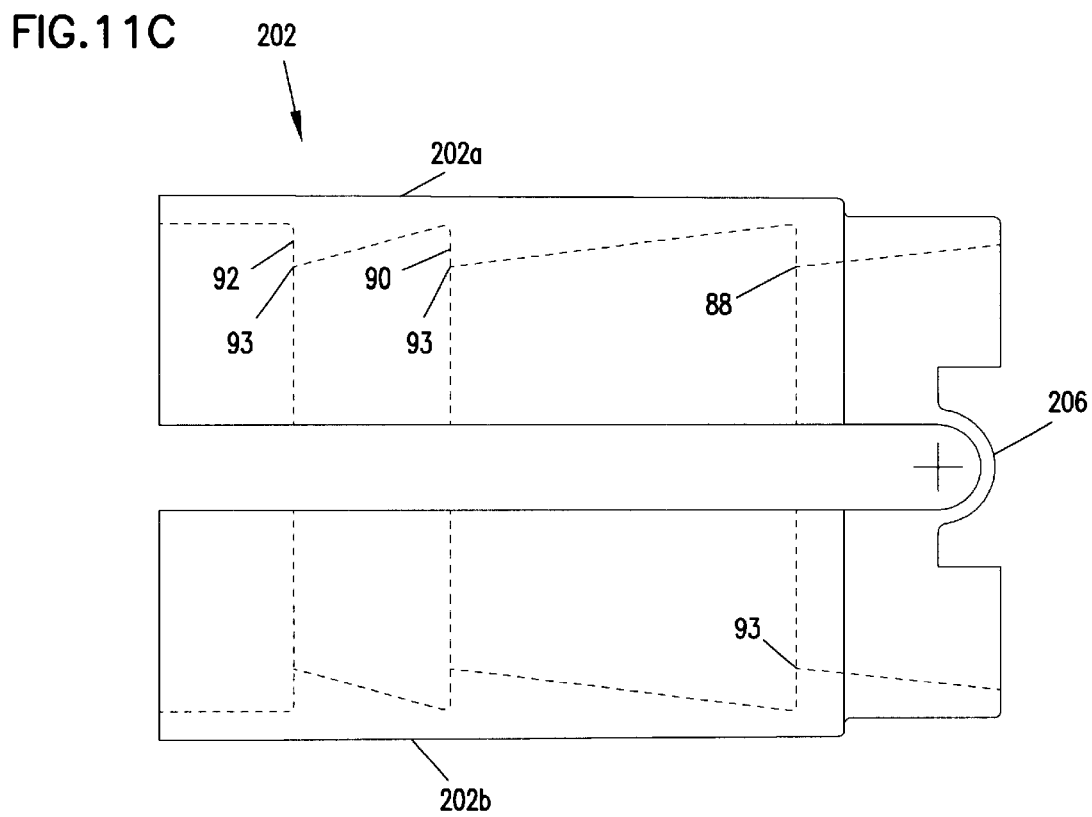
FIG.11C

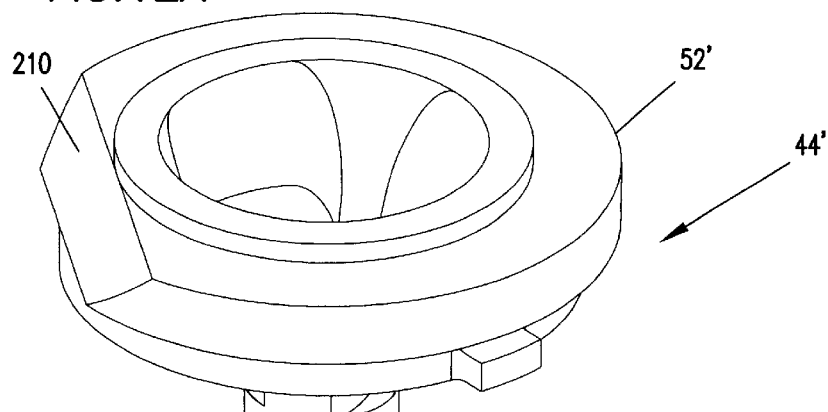
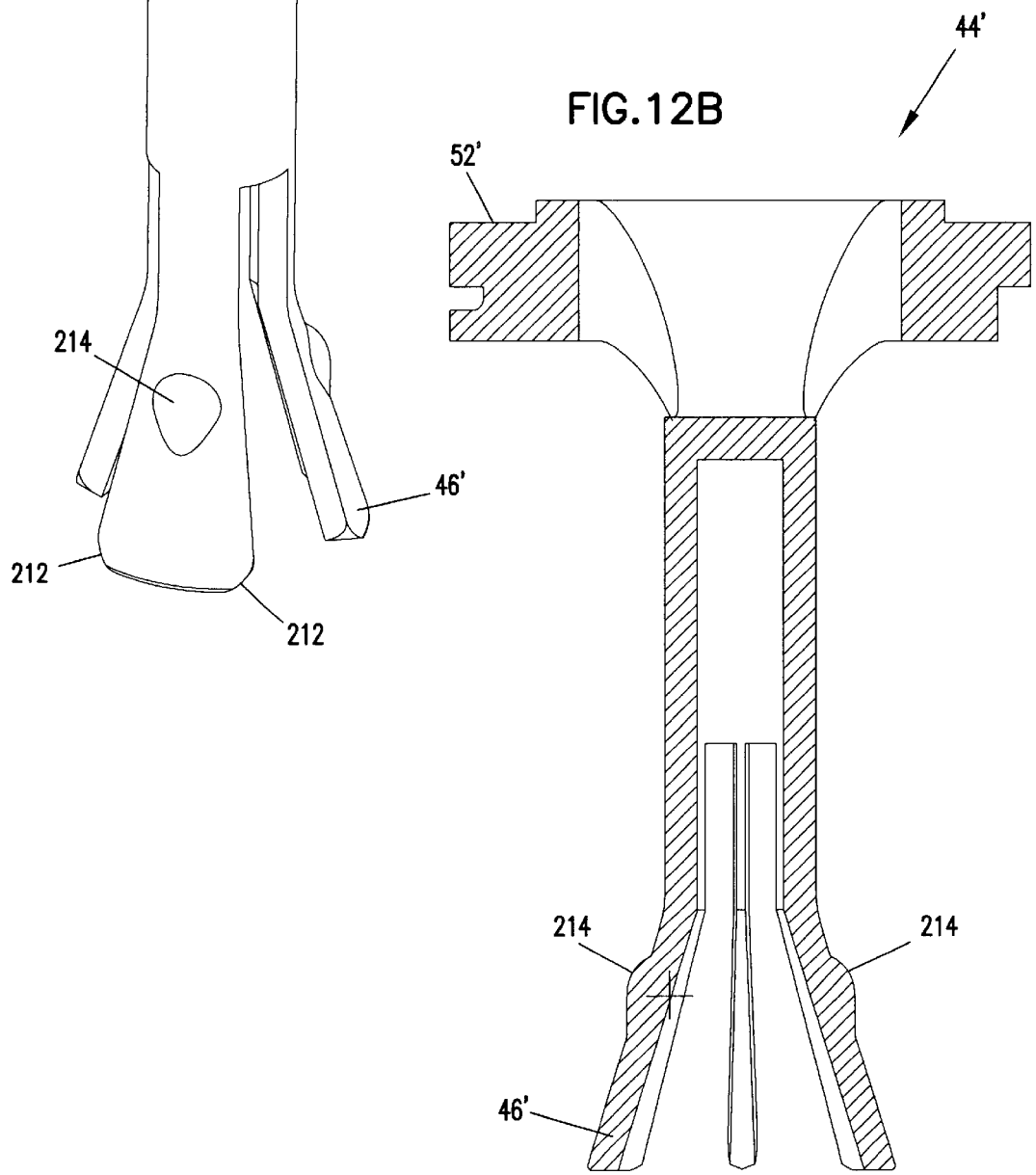

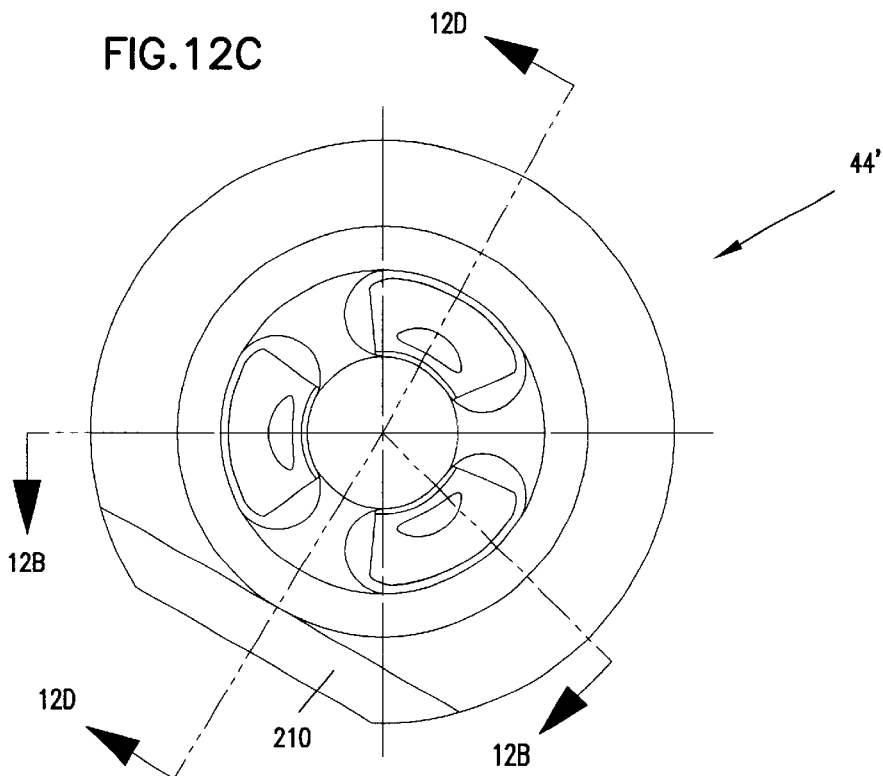
FIG.12C
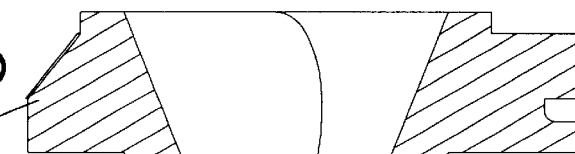
FIG12D
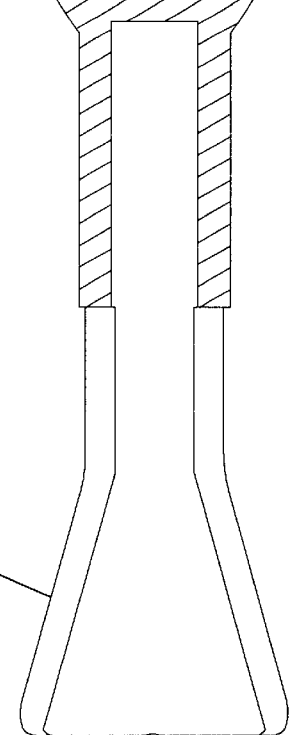

RESTRICTION INDICATOR

FIELD OF THE INVENTION

This invention relates generally to restriction indicators, and more particularly to restriction indicators for use with combustion engine intake air cleaners.

Background of the Invention

Restriction indicators are commonly used to indicate when it is recommended to service the air cleaner system of an internal combustion engine. Engine air cleaner systems usually use barrier filtration media that requires periodic servicing to ensue that adequate air flow is provided to the engine. Restriction indicators typically are connected to the air outlet of the air cleaner system upstream of the intake of the engine. Many mechanical restriction indicators employ a bellows-type diaphragm vented to the atmosphere, which is resisted from expanding by a compression spring. As the air cleaner system becomes more contaminated, the differential pressure between the "atmospheric" /high pressure side and the "negative" /low pressure side of the restriction indicator increases, thereby causing the diaphragm to expand. When the differential pressure has reached a certain level, the diaphragm typically becomes locked in an expanded position, and a constant warning signal is provided to the user that the air cleaner system is recommended to be serviced. An example of such prior art restriction indicators is shown in U.S. Pat. No. 3,443,365.

A problem associated with restriction indicators is providing a locking mechanism which will consistently lock and release after repeated use. In many designs, the locking mechanism includes a resettable plunger which engages a latch to lock the diaphragm in an expanded warning position. An example of this is shown by the '365 patent, in which the plunger is bent to engage the latch off-center. Another example is shown by U.S. Pat No. 4,445,456 which discloses a restriction indicator having a ratchet that swings through an arc and interlocks with a floating indicator. An inherent disadvantage of this indicator is that side loads from the ratchet can cause canting, misalignment, friction and binding of the floating indicator.

SUMMARY OF THE INVENTION

According to the present invention, a restriction indicator for an air cleaner system is provided.

One aspect of the present invention relates to a restriction indicator for an air cleaner system of an internal combustion engine. The restriction indicator includes a housing divided into first and second chambers by a diaphragm. A signal member is connected to the diaphragm. The signal member is moveable along an axis between a reset position and a first indicator position, and defines an axial opening within which a first retaining shoulder is located. A guide member is provided for guiding the signal member as the signal member is moved between the reset position and the first axial position. A retaining member is provided for retaining the signal member in the first indicator position. The retaining member extends within the axial opening of the signal member and includes at least two fingers that project radially outward from the axis. The fingers are configured to engage the first retaining shoulder to retain the signal member in the first indicator position. The restriction indicator further includes a reset button for deflecting the fingers radially inward to disengage the fingers from the first retaining shoulder thereby allowing the signal member to be returned to the reset position. The reset button includes a portion that extends within the axial opening of the signal member between the retaining member and the signal member.

These and other advantages and features of novelty that characterize the invention are pointed out with particularity in the claims annexed hereto. However, for a better understanding of the invention and its advantages, reference should be made to the drawings which form a further part hereof, and to the accompanying descriptive matter in which there are illustrated and described preferred embodiments of the invention.

BRIEF DESCRIPTION OF THE DRAWINGS

The accompanying drawings, which are incorporated in and constitute a part of the specification, illustrate several aspects of the invention and together with the description serve to explain the principles of the invention. A brief description of the drawings is as follows:

FIG. 1B is an exploded, perspective view of a restriction indicator constructed in accordance with the principles of the present invention;

FIG. 3A is a perspective view of the cap of the restriction indicator of FIG. 1;

FIG. 3B is a top view of the cap of FIG. 3A;

FIG. 3C is a cross-sectional view taken along section line 3C—3C of FIG. 3B;

FIG. 3D is a cross-sectional view taken along section line 3D—3D of FIG. 3B;

FIGS. 11A and 11B are perspective views of an insert shown in the sub-assembly of FIGS. 8 and 9;

FIG. 11C is a side view of the insert of FIGS. 11A and 11B;

FIGS. 12A–12D show various views of an alternate retaining member constructed in accordance with the principles of the present invention;

DETAILED DESCRIPTION

Reference will now be made in detail to various aspects of the present invention which are illustrated in the accompanying drawings. Wherever possible, the same reference numbers will be used throughout the drawings to refer to the same or like parts.

Figure 1A:
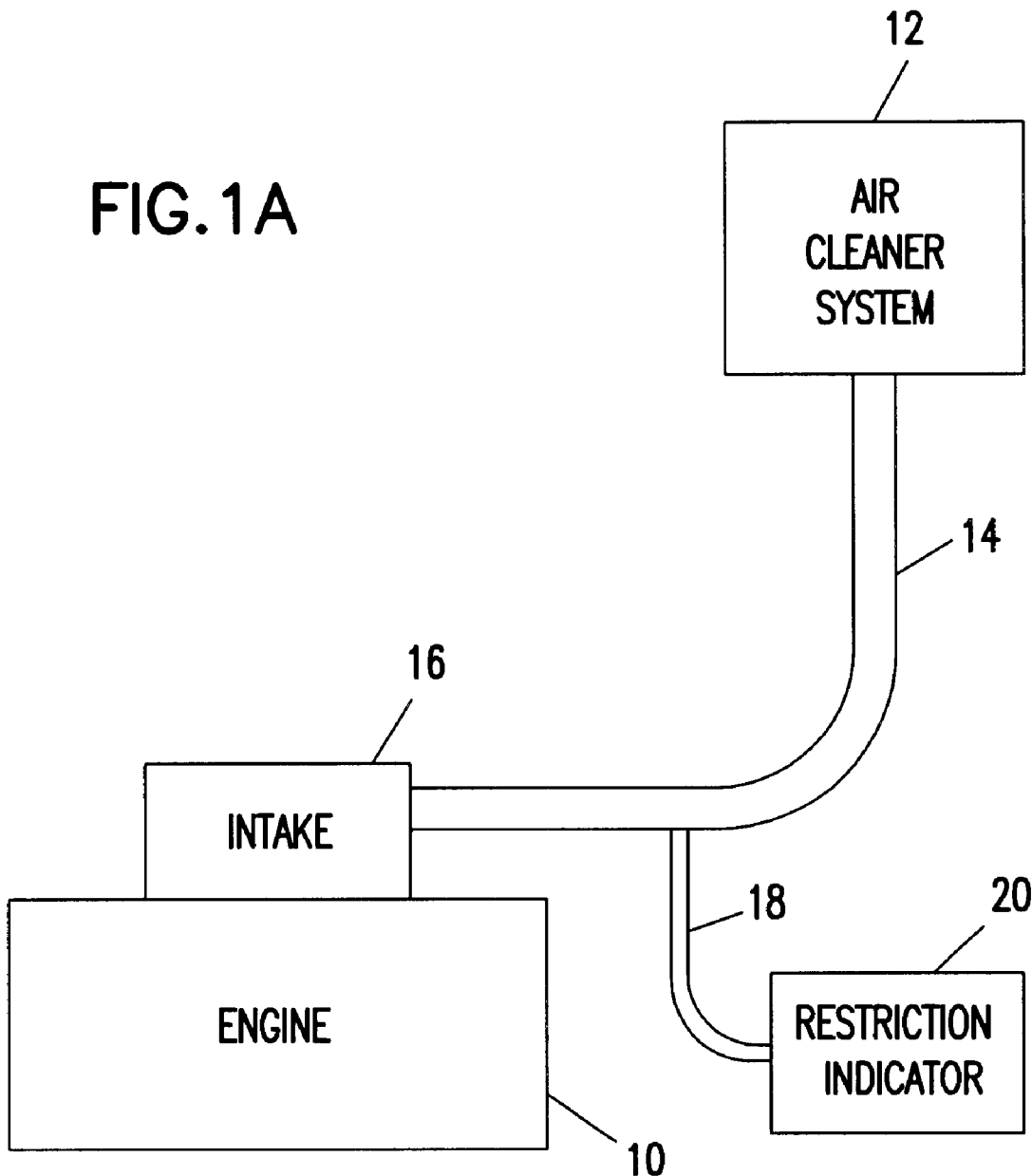
FIG. 1A is a schematic illustration of an intake system of an internal combustion engine.

FIG. 1A schematically illustrates an intake system of an internal combustion engine 10. The system includes an air cleaner system 12 (e.g., a barrier such as a filter media) and a conduit 14 that directs clean air from the air cleaner system 12 to an intake 16 of the engine. A tube 18 or other type of conduit provides fluid communication between the conduit 14 and a restriction indicator 20 in accordance with the principles of the present invention. The restriction indicator 20 is used to indicate when the pressure within the conduit 14 falls below a predetermined pressure level. The predetermined pressure level will vary depending upon the size and type of engine. In certain non-limiting embodiments, the predetermined pressure level is in the range of 15–30 inches of water.

FIG. 1B illustrates one embodiment of the restriction indicator 20. As shown in FIG. 1B, the restriction indicator 20 includes a housing 21 having a main body 22 and a cap 24. At least portions of the main body 22 can be transparent. The top of the cap 24 is enclosed by a resilient button cover 26 that inhibits dirt and moisture from entering the housing 21. A diaphragm 28 is provided for dividing the housing into a first chamber 29 (shown in FIG. 6A) corresponding to the cap 24, and a second chamber 31 (shown in FIG. 6A) corresponding to the main body 22. The cap 24 includes a venting slot 30 for venting the first chamber 29 to atmosphere.

The main body 22 is adapted for connection to a source of low pressure such as the intake stream 14 of the internal combustion engine 10. For example, the main body 22 is shown including a barbed end 32 for providing a connection with the tube 18 that is in fluid communication with the intake stream 14. By placing a rubber grommet (not shown) over the barbed end 32, and inserting the tube 18 over the rubber grommet, a fluid tight connection is provided. A port 33 (shown in FIG. 6A) defined through the barbed end 32 provides fluid communication between the tube 18 and the second chamber 31.

Referring still to FIG. 1B, a signal member 34 is positioned between the main body 22 and the cap 24. The diaphragm 28 is secured to the signal member 34 by a retaining ring 36 that is connected to a top end of the signal member 34. The signal member 34 is moveable along an axis 38 between a plurality of axially-spaced apart indicator positions (e.g., four indicator positions are shown in shown in FIGS. 6A–6D). A guide member 40 is provided for guiding the signal member 34 between the indicator positions, and a return spring 42 is provided for biasing the signal member 34 in an upward direction (i.e., toward the button cover 26). A retaining member 44 is used to retain the signal member 34 in the indicator positions. The retaining member 44 includes resilient fingers or prongs 46 that engage the signal member 34 to prevent the signal member from being moved upward by the return spring 42. A reset button 48 for disengaging the prongs 46 from the signal member 34 is positioned below the button cover 26. The reset button 48 is biased in an upward direction by a reset button spring 50.

Figure 2A:
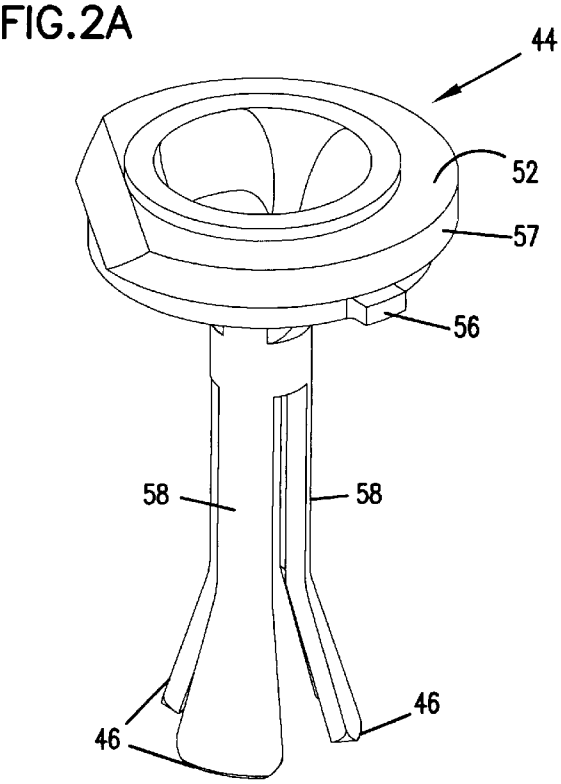
FIG. 2A is a perspective view of the retaining member of the restriction indicator of FIG. 1.
Figure 2B:
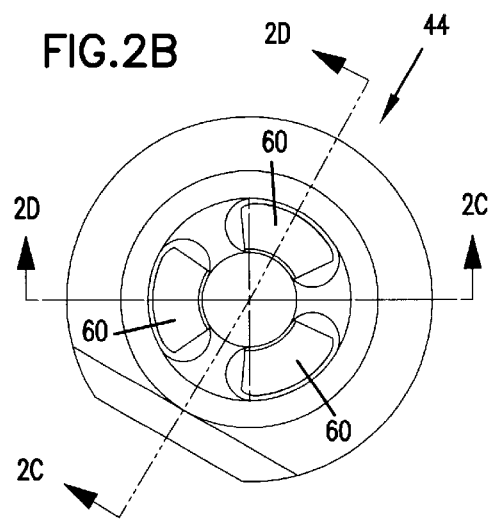
FIG. 2B is a top view of the retaining member of FIG. 2A.
Figure 2D:
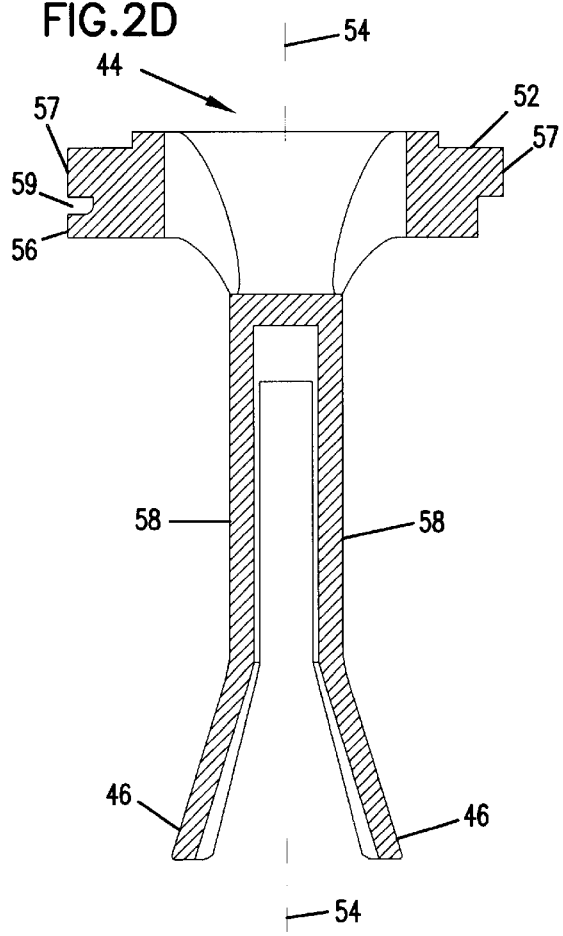
FIG. 2D is a cross-sectional view taken along section line 2D—2D of FIG. 2B.
Figure 2C:
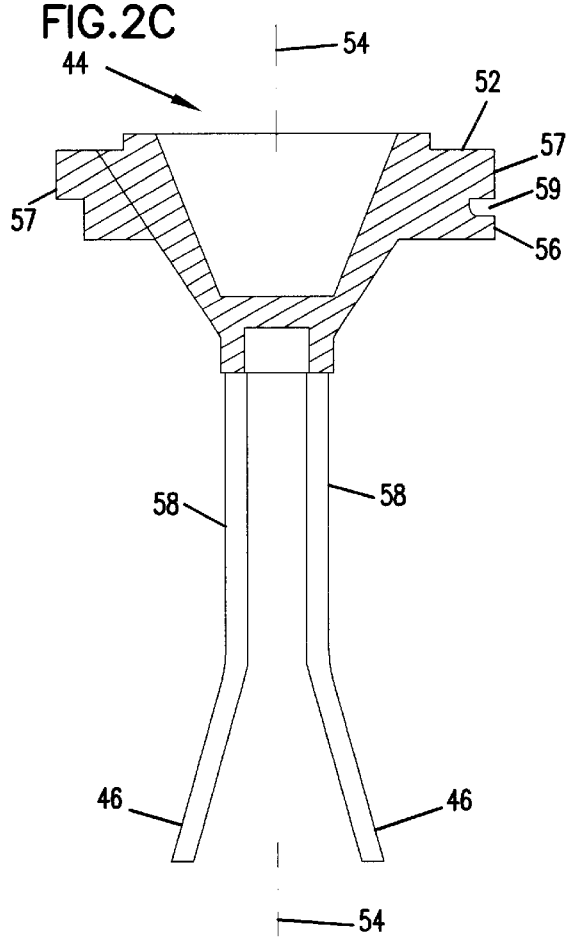
FIG. 2C is a cross-sectional view taken along section line 2C—2C of FIG. 2B.

FIGS. 2A–2D illustrate the retaining member 44 in isolation from the remainder of the restriction indicator 20. As best shown in FIG. 2A, the retaining member 44 includes a generally disk-shaped mounting hub 52 centered about an axis 54. Two mounting tabs 56 project radially outward from opposite sides of the hub 52. An annular shoulder 57 is positioned above the mounting tabs 56. Slots 59 are formed between the mounting tabs 56 and the shoulder 57. Three retaining legs 58 project axially downward from the hub 52. The retaining legs 58 are preferably uniformly or symmetrically spaced about the axis 54. The retaining prongs 46 project radially and axially outward/downward from the legs 58. As best shown in FIG. 2B, the retaining member 44 also defines reset button openings 60 that extend axially through the hub 52. The reset button openings are preferably uniformly spaced about the axis 54.

It is preferred to have at least two of the retaining fingers 46, and more preferred to have three retaining fingers 46. However, it will be appreciated any number of retaining fingers 46 could be used. Also, while the fingers 46 have been illustrated in a generally symmetrical configuration about the axis 54, non-symmetrical or non-uniformly spaced configurations could also be used. As shown in the Figures, it is preferred for the fingers 46 to have generally "cantilevered" configurations.

Figure 6A:
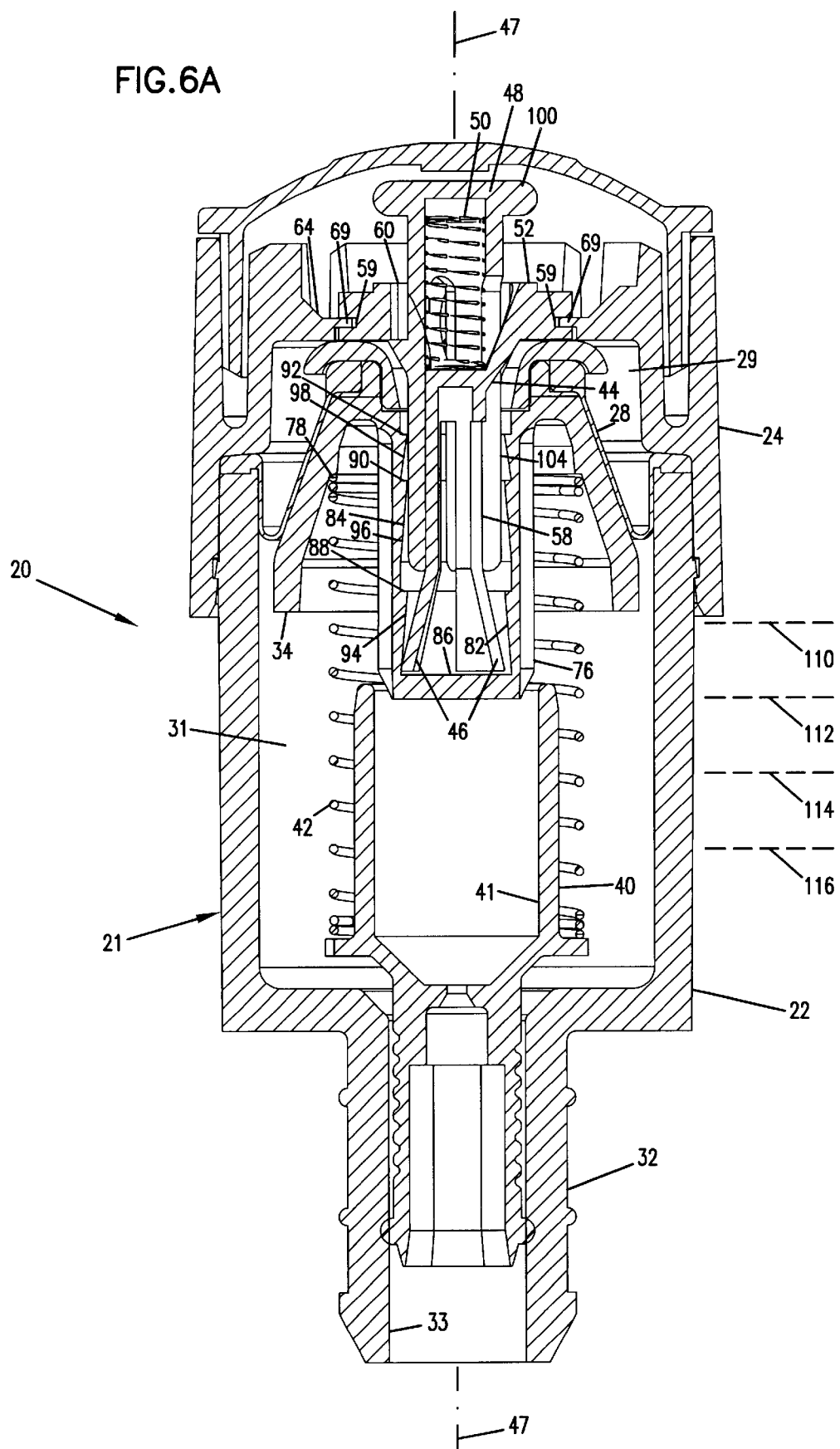
FIG. 6A is a cross-sectional view of the restriction indicator shown in FIG. 1 with the indicator in a reset position.

FIGS. 3A–3D show the cap 24 in isolation from the remainder of the restriction indicator 20. As best shown in FIG. 3A, the cap 24 is generally cylindrical and defines an annular top groove 62 for receiving the button cover 26. The venting slot 30 is formed through a side wall of the cap 24 and is in fluid communication with the top groove 62. The cap 24 also includes a mounting platform 64 positioned below the top groove 62. The mounting platform 64 defines a central opening 66 sized for receiving the hub 52 of the retaining member 44. A pair of oppositely positioned tapered slots 68 are defined about the central opening 66 beneath the mounting platform 64. The slots 68 are sized for receiving the tabs 56 of the hub 52. The tabs 56 can be inserted into the slots 68 through notches 70 positioned on opposite sides of the central opening 66. The retaining member 44 is secured to the cap 24 by inserting retaining member downwardly through the opening 66 such that the retaining legs 58 extend through the opening 66 and the tabs 56 fit within the notches 70. Thereafter, the retaining member 44 and the cap 24 are interlocked by rotating the retaining member 44 relative to the cap 24 such that the tabs 56 slide along the slots 68 causing upper lips 69 of the platform 64 to be captured within the slots 59 of the retaining member 44 as shown in FIG. 6A. The taper of the slots 68 and detents 72 inhibit the retaining member from rotating back toward the insertion orientation.

Figure 4A:
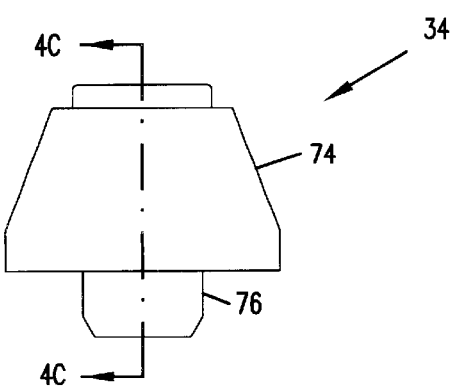
FIG. 4A is an elevational view of the signal member of the restriction indicator of FIG. 1.
Figure 4B:
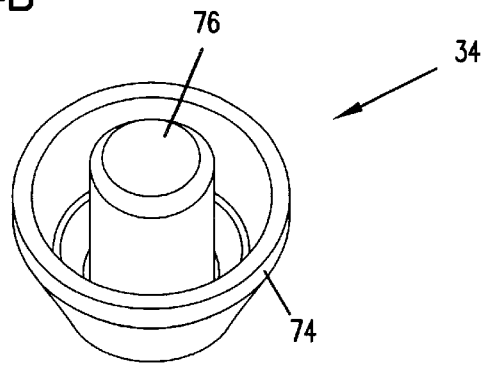
FIG. 4B is a bottom, perspective view of the signal member of FIG. 4A.
Figure 4C:
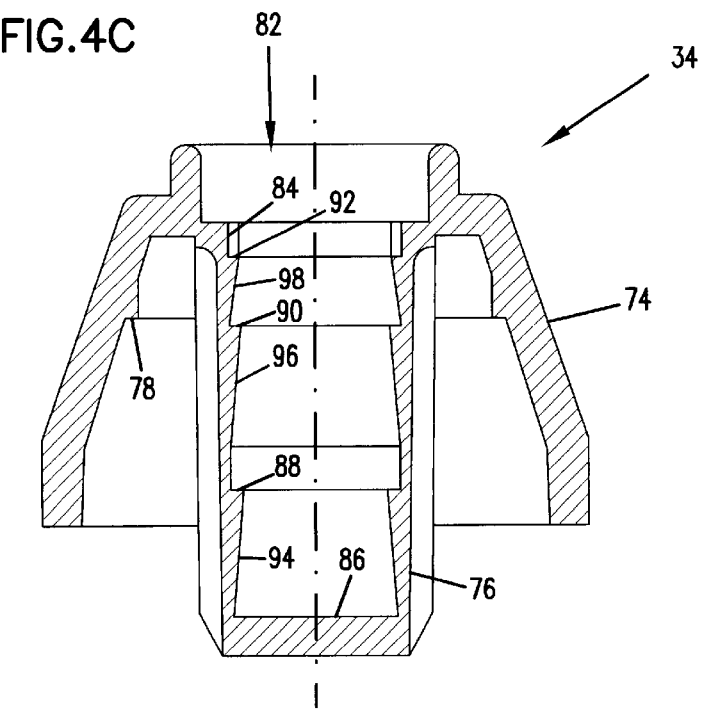
FIG. 4C is a cross-sectional view taken along section line 4C—4C of FIG. 4A.

FIGS. 4A–4C illustrate the signal member 34 in isolation from the remainder of the restriction indicator 20. The signal member 34 includes an outer skirt portion 74 that projects radially outward from a cylindrical inner portion 76. The skirt portion 74 includes an annular shoulder 78 for engaging one end of the return spring 42. The cylindrical portion 76 of the signal member 34 defines an inner bore 82. The bore 82 is defined by a side wall 84 and a bottom wall 86 of the cylindrical portion 76. First, second and third axially spaced apart shoulders 88, 90 and 92 are defined by the side wall 84. The shoulders 88, 90 and 92 shoulders extend about an inner diameter of the cylindrical portion 76 and project radially into the bore 82. In one particular embodiment, each shoulder 88, 90 and 92 includes a plurality of separate segments arranged in a ring-shaped configuration. Ramps 94, 96 and 98 are respectively positioned above each of the shoulders 88, 90 and 92. In one particular embodiment, the ramps are generally frusto-conical in shape. The ramps 94, 96 and 98 taper radially inward as the ramps 94, 96 and 98 extend in an upward direction.

For the purpose of this specification, the term "shoulder" is intended to include any surface or structure that projects in a transverse or radial direction relative to a central axis of the bore 82.

Figure 5A:
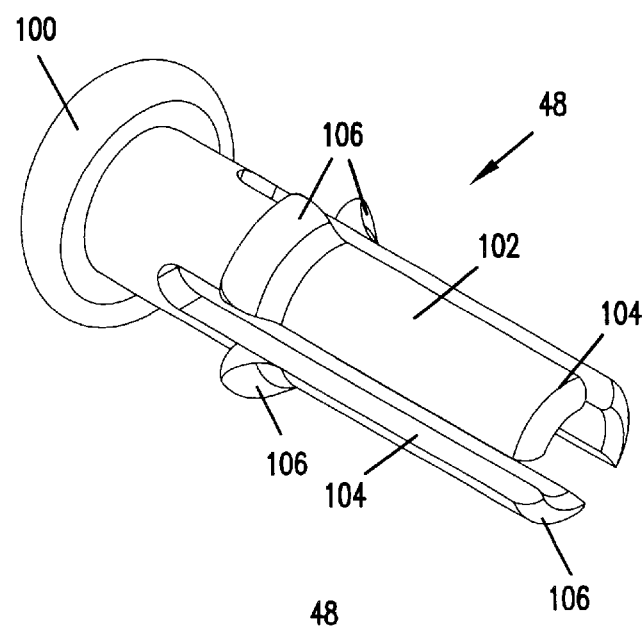
FIG. 5A is a perspective view of the reset button of the restriction indicator of FIG. 1.
Figure 5B:
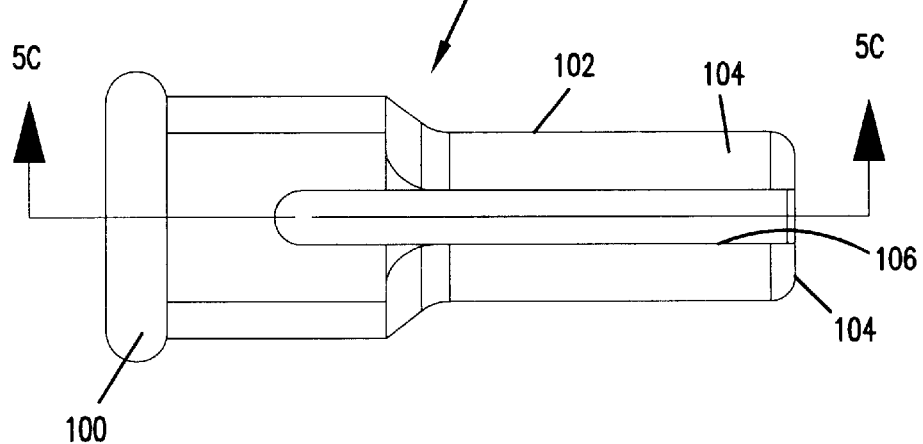
FIG. 5B is a side view of the reset button of FIG. 5A.
Figure 5C:
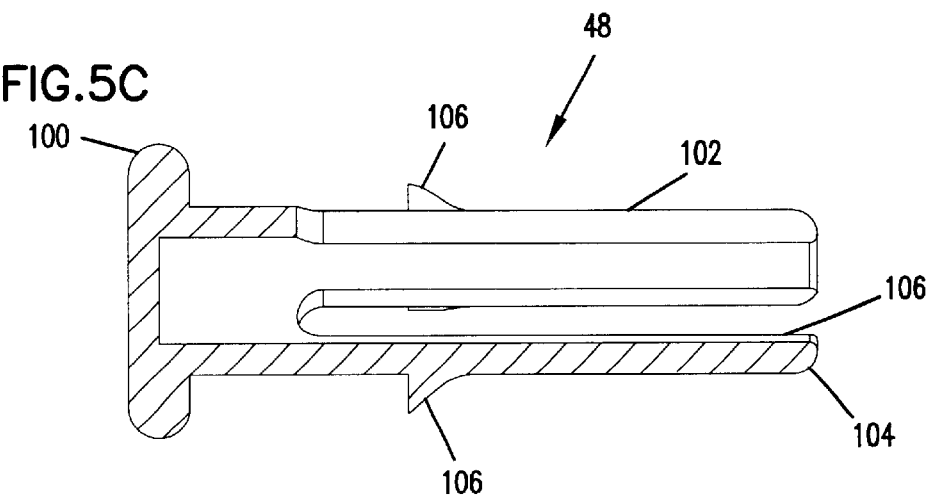
FIG. 5C is a cross-sectional view taken along section line 5C—5C of FIG. 5B.

FIGS. 5A–5C illustrate the reset button 48 in isolation from the remainder of the restriction indicator 20. The reset button 48 includes a button head 100 and a hollow shaft 102 that projects axially outward from the button head 100. The hollow shaft 102 is preferably formed by three axial legs 104 that are separated by axial slots 106. The axial legs 104 are preferably uniformly spaced about a central axis of the shaft. The reset button further includes retaining shoulders 106 that project radially outward from the legs 104. While three legs 104 have been shown, it will be appreciated that any number of legs could be used.

FIGS. 6A–6D illustrate the restriction indicator 20 in a filly assembled orientation. As fully assembled, the main body 22 is fitted within the cap 24, and the button cover 26 is fitted within the annular top groove 62 of the cap 24. An outer circumferential portion of the diaphragm 28 is clamped between the main body 22 and the cap 24, and an annular inner portion of the diaphragm 28 is clamped between the retaining ring 36 and the signal member 34. The diaphragm 28 divides the housing into the first chamber 29 (e.g., a high pressure chamber) and the second chamber 31 (e.g., a low pressure chamber).

Still referring to the assembled configuration of FIGS. 6A–6D, the hub 52 of the retaining member 44 is interlocked with the platform 64 of the cap 24 and the retaining legs 58 extend into the bore 82 of the signal member 34. The axial legs 104 of the reset button 48 extend through the reset button openings 60 of the hub 52. The retaining shoulders 106 engage the underside of the hub 52 to prevent the reset button 48 from detaching from the retaining member 44. The reset button spring 50 is positioned within the hollow shaft 102 and captured between the button head 100 and the hub 52. The axial legs 104 of the reset button 48 are positioned between the side wall 84 of the signal member 34 and the retaining legs 58 of the retaining member 44. The axial legs 104 are preferably sufficiently close to the side wall 84 to limit or inhibit wobbling of the signal member 34. Wobbling is also inhibited by the symmetrical configuration of the fingers 46 about a longitudinal axis 47 of the indicator 20.

Referring still to FIGS. 6A–6D, the guide member 40 is threaded within the barbed end 32 of the main body 22 and oriented such that an opening 41 of the guide member is in co-axial alignment with the inner portion 76 of the signal. The return spring 42 is captured between the guide member 40 and the annular shoulder 78 of the signal member 34. By threading the guide member 40 in or out of the barbed end 32, the tension of the return spring 42 can be adjusted to calibrate the restriction indicator.

Figure 6B:
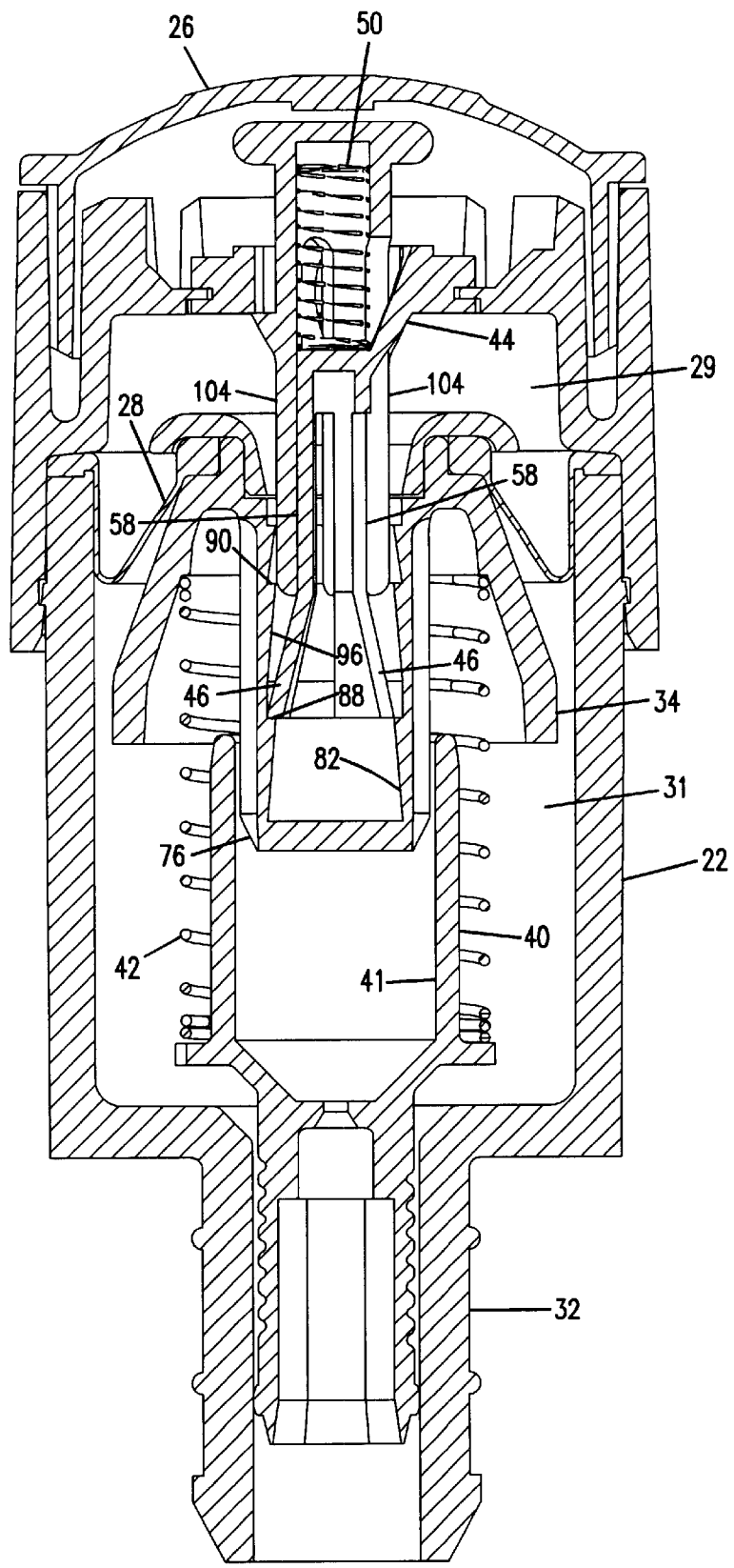
FIG. 6B is a cross-sectional view of the restriction indicator shown in FIG. 1 with the indicator in a first intermediate position.
Figure 6C:
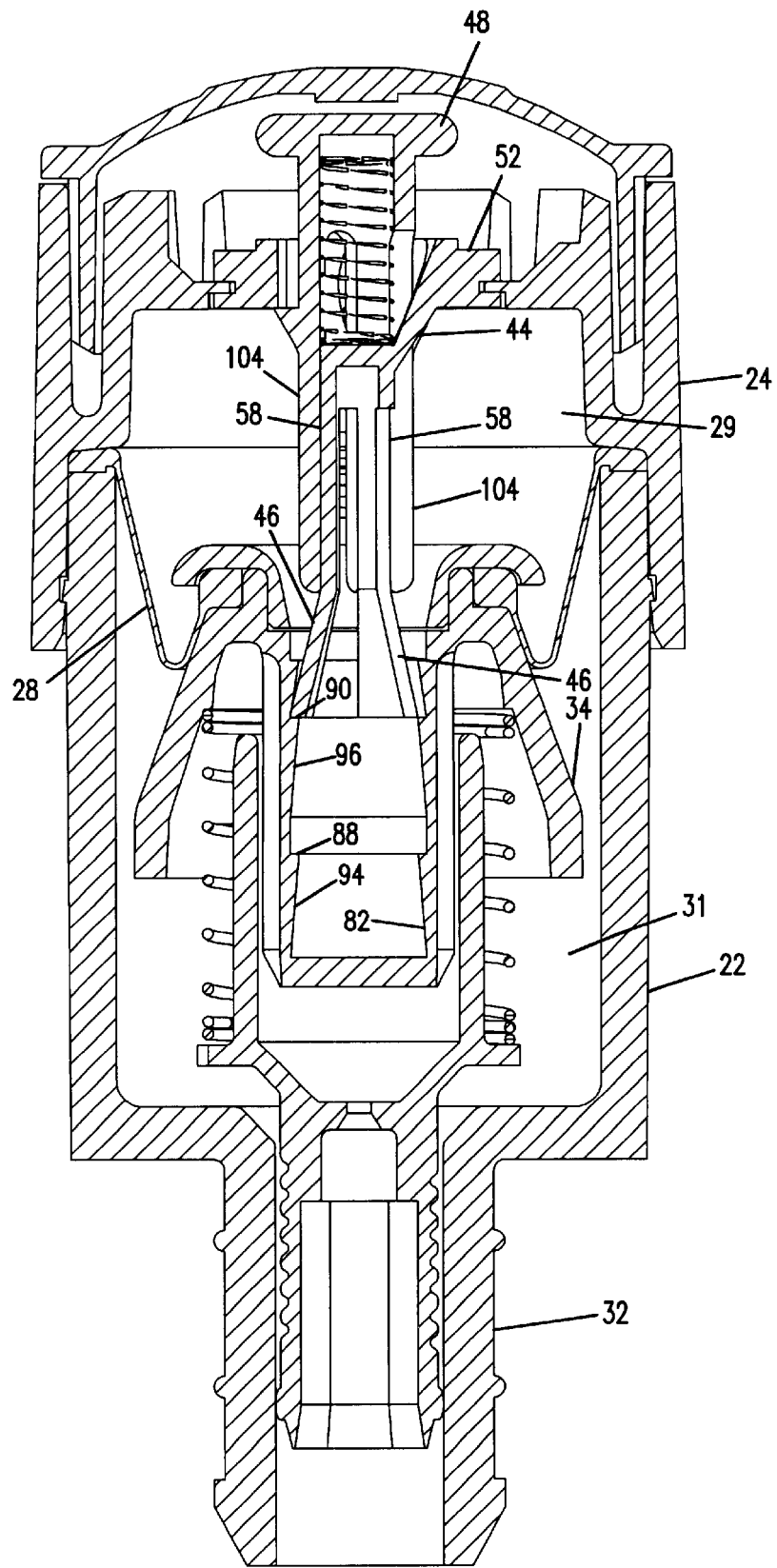
FIG. 6C is a cross-sectional view of the restriction indicator shown in FIG. 1 with the indicator in a second intermediate position.
Figure 6D:
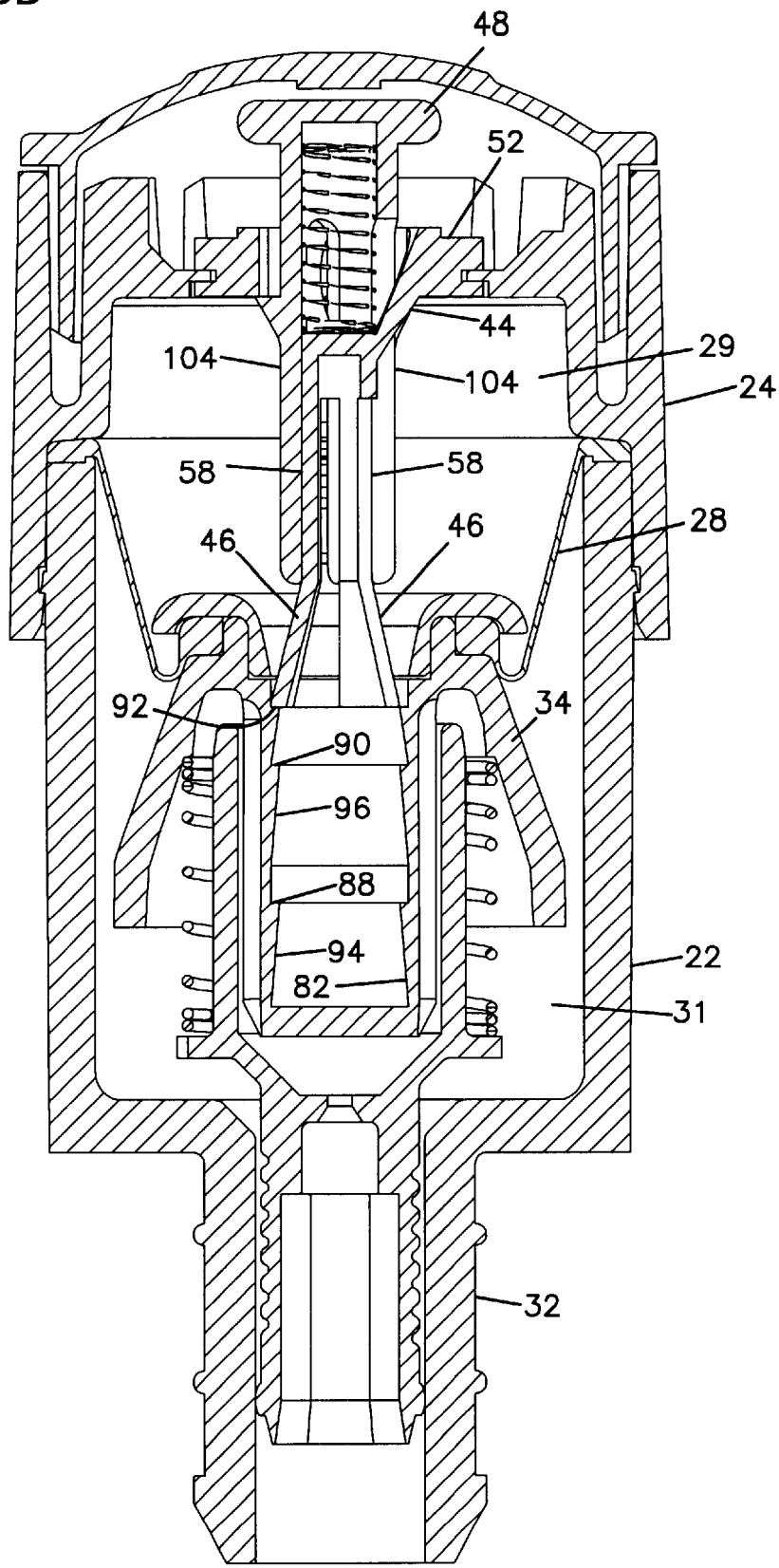
FIG. 6D is a cross-sectional view of the restriction indicator shown in FIG. 1 with the indicator in a full warning/change filter position.

As assembled, the signal member 34 is moveable between a reset position (shown in FIG. 6A), a first intermediate position (shown in FIG. 6B), a second intermediate position (shown in FIG. 6C) and a warning/change filter position (shown in FIG. 6D). In the reset position, the resilient fingers 46 engage the bottom 86 of the signal member 34. Preferably, markings are provided on the main body 22 for allowing a user to readily detect the position of the signal member 34. For example, referring to FIG. 6A, first, second, third and fourth restriction level indication lines 110, 112, 114 and 116 are schematically shown. The lines 110, 112, 114 and 116 are respectively representative of the reset position, the first intermediate position, the second intermediate position and the warning/change filter position. Transparent portions of the main body 22 preferably allow the signal member 34 to be viewed through the main body 22 to determine the position of the signal member 34.

In use, the low pressure chamber 31 is placed in fluid communication with the intake air stream 14 of the internal combustion engine 10. As the air cleaning system 12 loads with contaminants, the pressure in the air intake line 14 drops thereby causing the pressure in the low pressure chamber 31 to drop. When the pressure in the low pressure chamber 31 drops, the diaphragm 28 and the signal member 34 move downward from the reset position of FIG. 6A toward the first intermediate position of FIG. 6B. The movement of the signal member 34 toward the first intermediate position causes the fingers 46 to be deflected radially inward by the ramp 94. The fingers 46 continue to deflect radially inward until signal member 34 reaches the first intermediate position and the fingers snap radially outward past the first shoulder 88 as shown in FIG. 6B. Thereafter, contact between the first shoulder 88 and the fingers 46 prevents the signal member 34 from returning to the reset position.

As the pressure in the low pressure chamber 31 continues to drop, the signal member slides from the first intermediate position of FIG. 6B toward the second intermediate position of FIG. 6C. The movement of the signal member 34 toward the second intermediate position causes the fingers 46 to be deflected radially inward by the ramp 96. The fingers 46 continue to deflect radially inward until signal member 34 reaches the second intermediate position and the fingers snap radially outward past the second shoulder 90 as shown in FIG. 6C. Thereafter, contact between the second shoulder 90 and the fingers 46 prevents the signal member 34 from returning to the reset position.

Upon reaching the second intermediate position of FIG. 6C, a continued pressure drop will cause the signal member 34 to slide toward the warning/change filter position of FIG. 6D. The movement of the signal member 34 toward the warning/change filter position causes the fingers 46 to be deflected radially inward by the ramp 98. The fingers 46 continue to deflect radially inward until signal member 34 reaches the second intermediate position and the fingers snap radially outward past the third shoulder 92 as shown in FIG. 6D. Thereafter, contact between the third shoulder 92 and the fingers 46 prevents the signal member 34 from returning to the reset position.

After the filter has been changed, the restriction indicator 20 can be reset by depressing the reset button 48. When the reset button 48 is depressed, the button 48 slides downward relative to the retaining member 44 causing the fingers 46 to become sheathed within the hollow shaft 104. As the shaft 104 slides over the fingers 46, the fingers 46 are forced radially inward a sufficient distance that the fingers no longer engage or interlock with the shoulders 88, 90 and 92. Consequently, with the button 48 depressed, the return spring 42 causes the signal member 34 to return to the reset position of FIG. 6A. As the button 48 is depressed, the button slides linearly along the axis 47 shown in FIG. 6A. The linear motion reduces the likelihood that the signal member 34 will bind or misalign within the housing.

The fingers 46 are preferably sufficiently radially resilient to deflect radially inward a sufficient distance to clear the shoulders 88, 90 and 92 when a user presses on the button 48 with the user's index finger. Furthermore, the fingers 46 are preferably sufficiently resilient to spring back into a position of interference with the shoulders 88, 90, 92 when the button 48 is released. Furthermore, the fingers 46 preferably have sufficient axial and radial stiffness to retain an interlocked configuration with the shoulders 88, 90, 92 when the button 48 is not depressed. In other words, the fingers 46 are preferably sufficiently stiff to prevent the signal member 34 from being moved by the main return spring 42 upwardly past the shoulders 88, 90 and 92 when the button 48 is not depressed. When the fingers 46 deflect, the fingers 46 preferably bend along their lengths.

In a non-limiting example of the present invention, the main body 22 is made of transparent amorphous nylon (e.g., available from Dupont under the name Zytel®), the cap 24 is made of black amorphous nylon (e.g., available from Dupont under the name Zytel®), the cap cover 26 is made of elastomeric injection grade rubber (e.g., available from Advanced Elastomer Systems under the name Santoprene®), the guide member 40 is made of nylon or Santoprene®, the retaining member 44 is made of acetal (e.g., available from Dupont under the name Delrin®) having a flex modulus of 450,000 pounds per square inch (psi), the reset button is made of glass-filled acetal (25%) having a flex modulus of 840,000 psi, and the signal member 34 is made of polycarbonate having a flex modulus of 340,000 psi.

Figure 7:
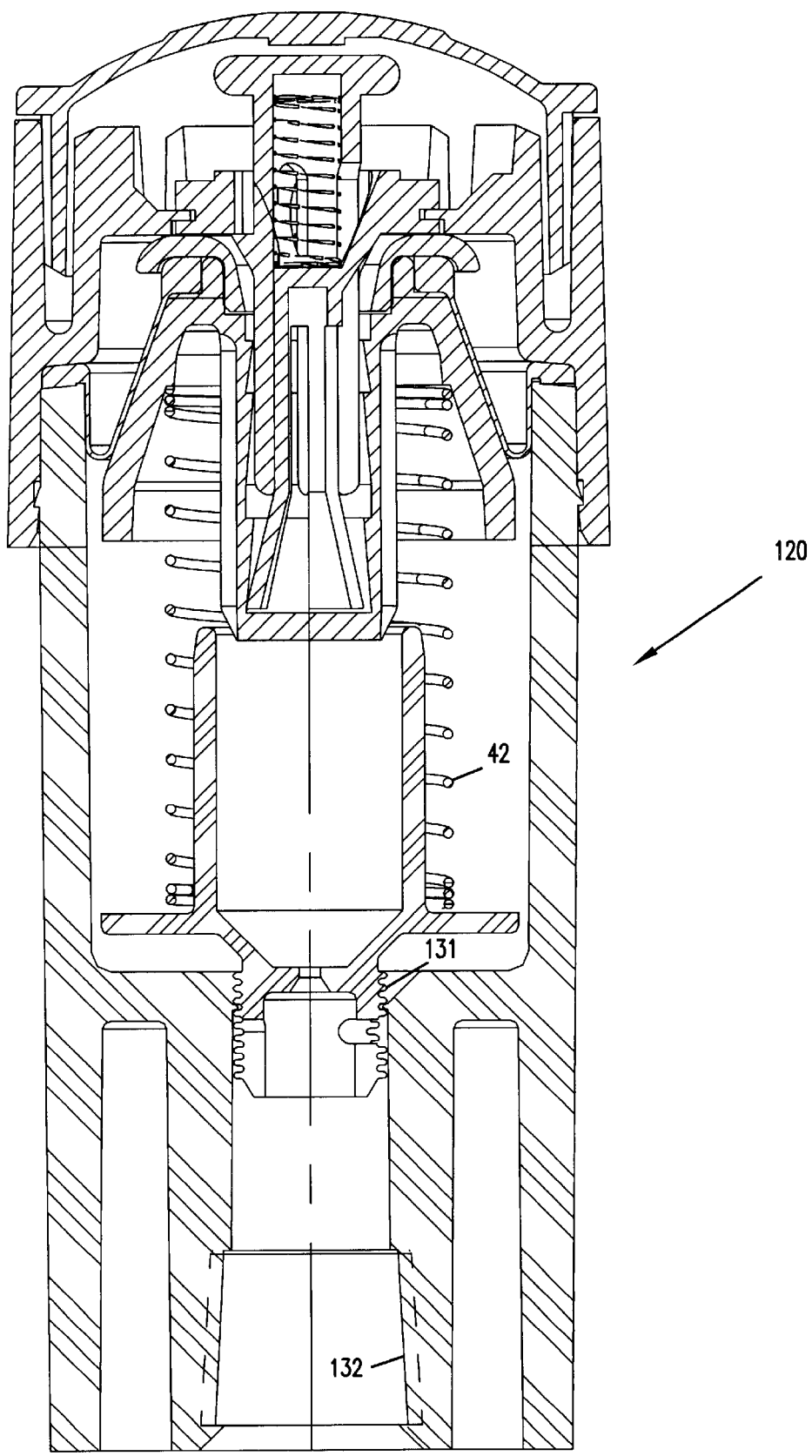
FIG. 7 illustrates another restriction indicator constructed in accordance with the principles of the present invention.

FIG. 7 illustrates another restriction indicator 120 constructed in accordance with the principles of the present invention. The restriction indicator has the same configuration as the restriction indicator 20, except that the barbed end 32 has been replaced with a internally threaded fitting 132 adapted for receiving an externally treaded male connector. Also, a detent mechanism 131 is used to adjust the tension of the return spring 42.

Figure 8:
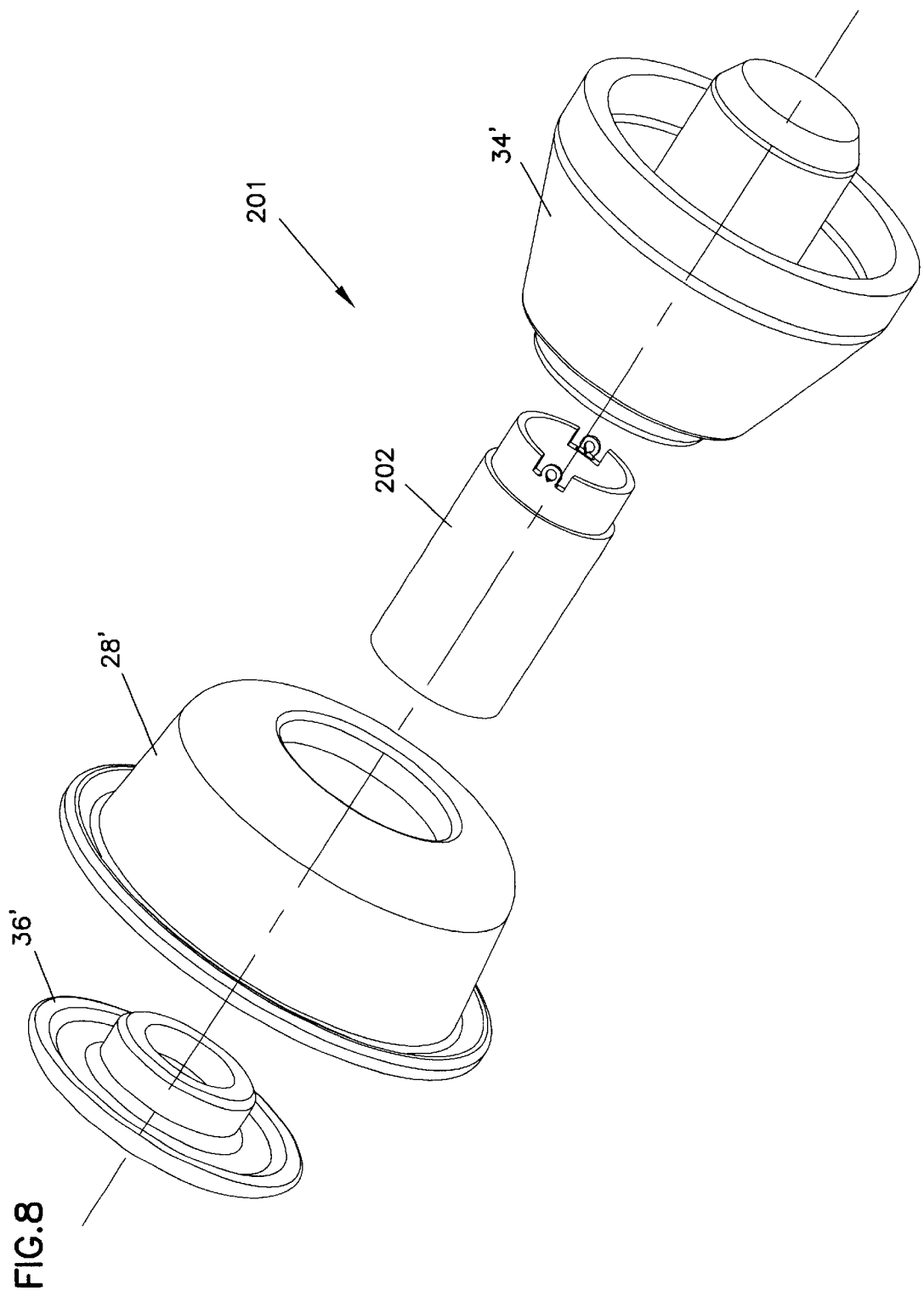
FIG. 8 is an exploded view of an alternate signal subassembly constructed in accordance with the principles of the present invention.
Figure 9:
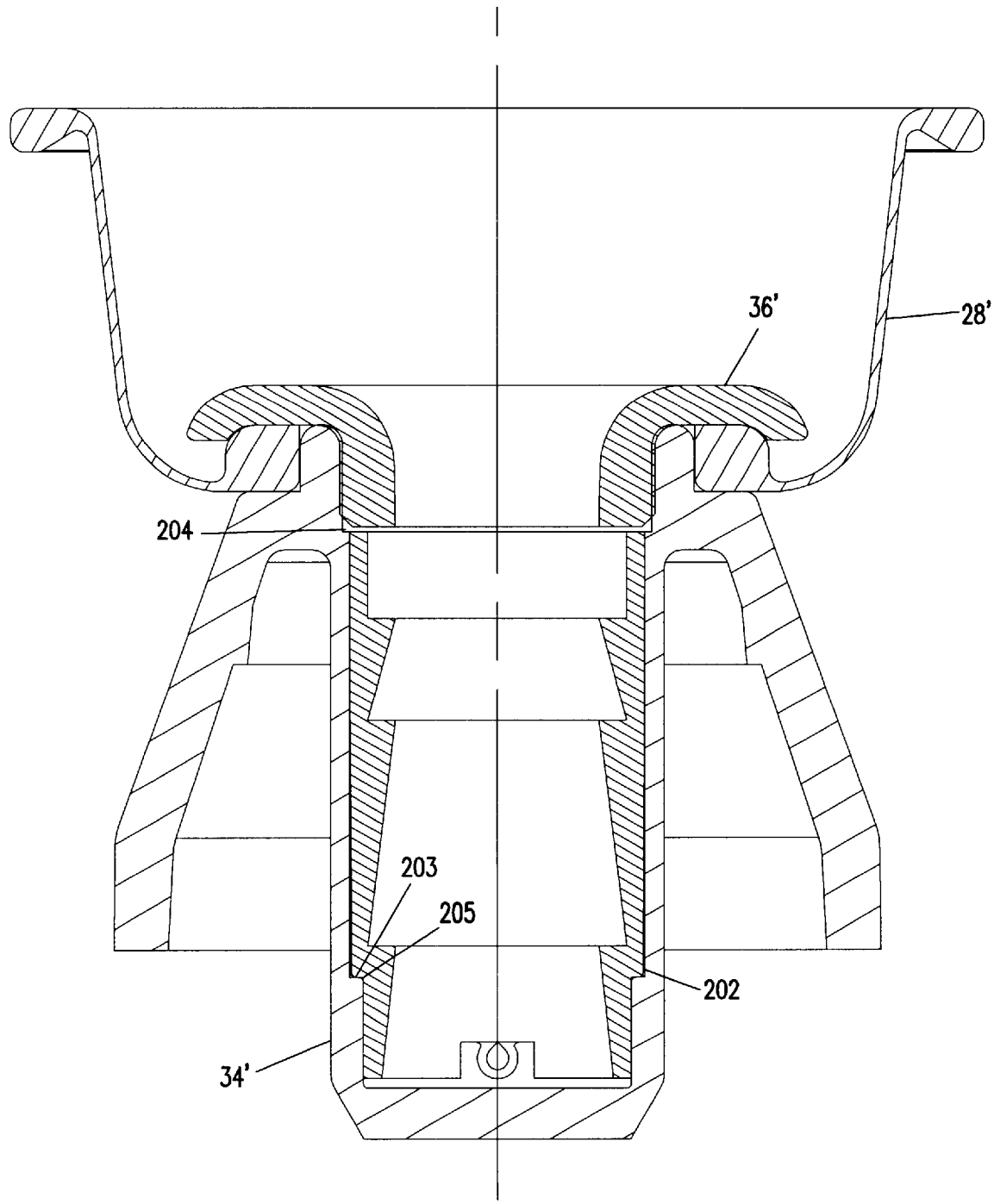
FIG. 9 is an assembled cross-sectional view of the sub-assembly of FIG. 8.
Figure 10:
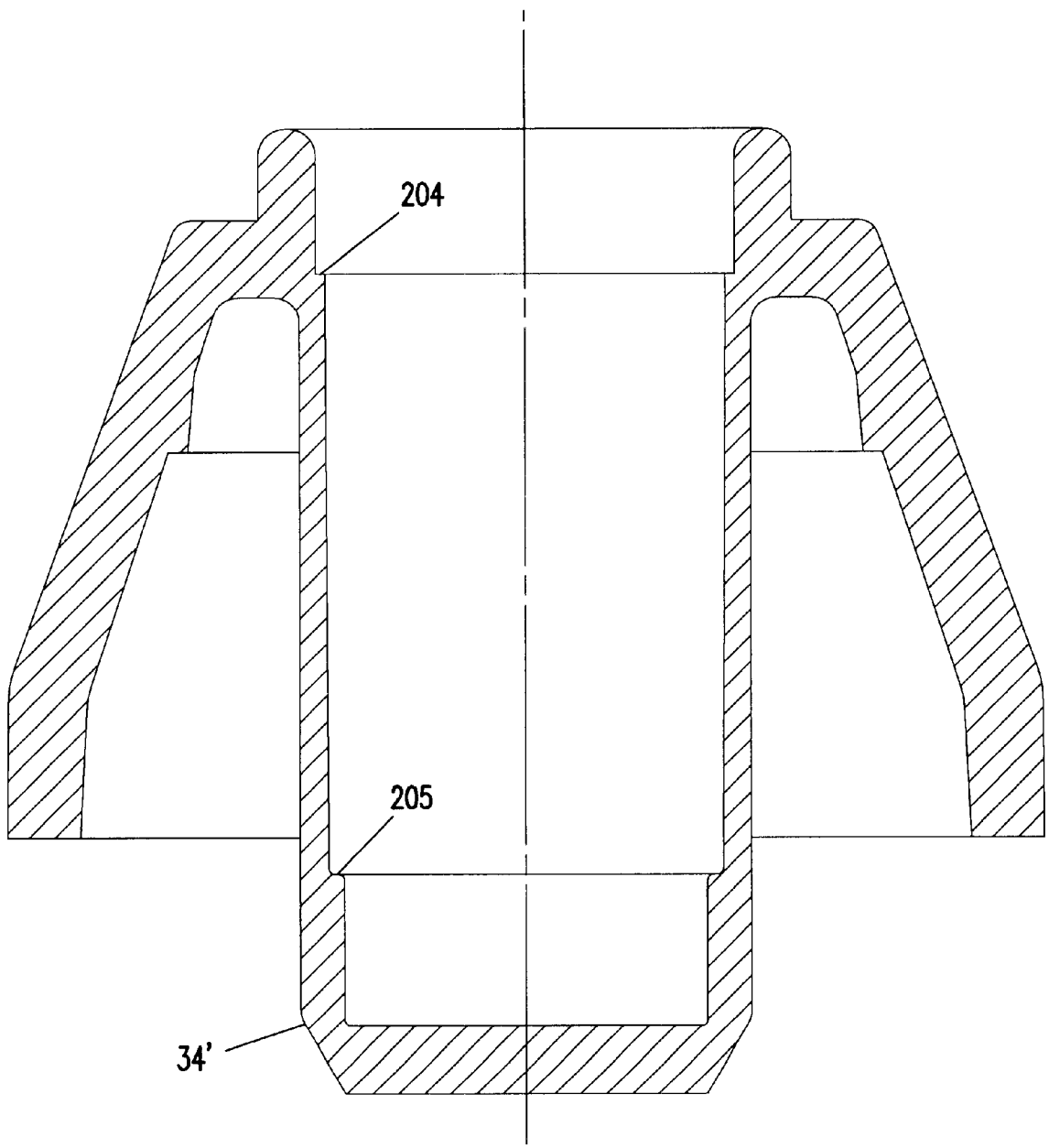
FIG. 10 is a cross-sectional view of a signal member shown in the sub assembly of FIGS. 8 and 9.
Figure 13A:
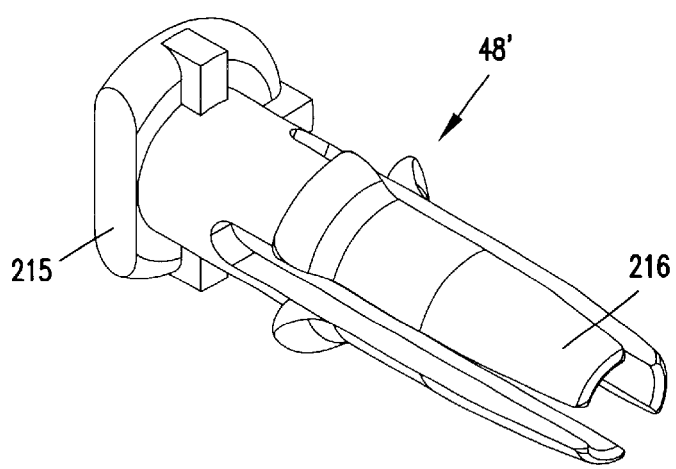
FIGS. 13A–13D show an alternate reset button constructed in accordance with the principles of the present invention.
Figure 13B:
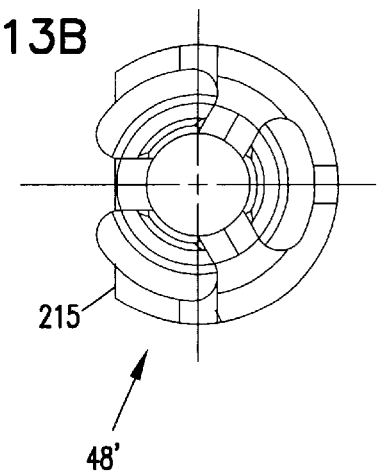
Figure 13C:
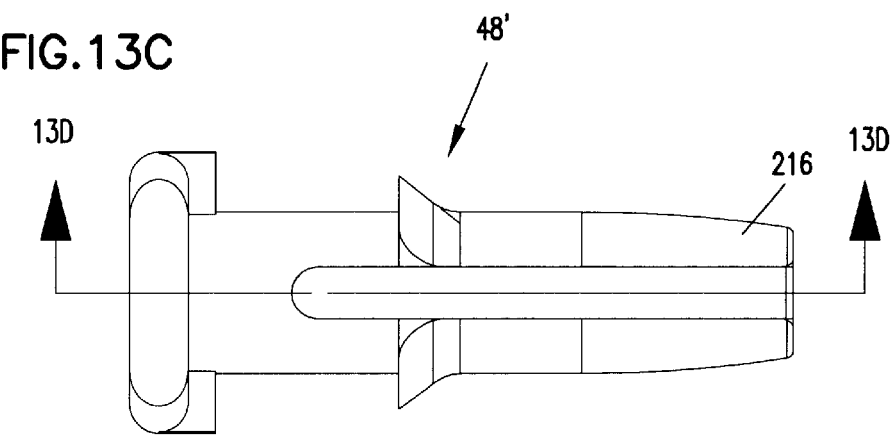
Figure 13D:
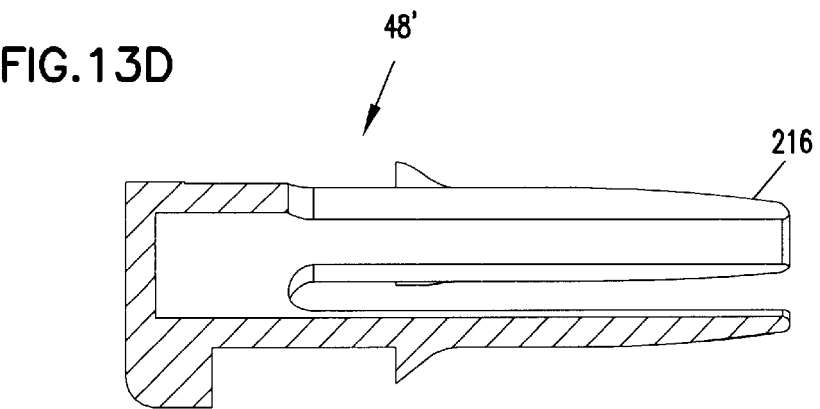

FIG. 8 shows an alternative signal sub-assembly 201 constructed in accordance with the principles of the present invention. The assembly includes a signal member 34', an insert 202, a diaphragm 28', and a retaining ring 36' for securing the diaphragm 28' to the signal member 34'. As shown in FIG. 9, the insert 202 is press fit within the signal member 34'. As mounted in the signal member 34', a shoulder 203 of the insert 202 seats on a first shoulder 205 (best shown in FIG. 10) of the signal member 34'. The retaining ring 36' is press-fit within the signal member 34' above the insert 202. A lower end of the ring 36' seats on a second shoulder 204 (best shown in FIG. 10) provided in the signal member 34'.

As best shown in FIGS. 11A–11C, the insert 202 is preferably made of 2 separate pieces 202a and 202b. As shown in the Figures, the two pieces 202a and 202b are connected by a flexible hinge 206 for preventing the pieces from separating or becoming misaligned during the assembly of the restriction indicator. A plurality of locking shoulders 88, 90 and 92 are defined within the insert. The shoulders 88, 90 and 92 are adapted for engaging a retaining structure (e.g., retaining fingers 46) of the restriction indicator. While three shoulders are shown, more or fewer could be provided (e.g., 5 could be provided in one embodiment). Small upper lips can be provided at the inner edges of the shoulders to further increase the aggressiveness of the shoulders.

When the pieces 202a and 202b are placed together, the insert defines an cylindrical openings into which the shoulders 88, 90 and 92 (which are annular) project. The two-piece construction facilitates the molding process, and allows more aggressive shoulders (i.e., shoulders that project farther into the cylindrical opening) to be formed within the relatively small diameter cylindrical opening. The insert 202 facilitates changing the number of lock-up shoulders provided by the sub-assembly because the insert can be relatively easily re-tooled. Thus, the number of shoulders can be altered without changing the design of the signal member 34'.

FIGS. 12A–12D show an alternative retaining member 44' constructed in accordance with the principles of the present invention. The retaining member 44' has a hub 52' with an alignment flat 210 for aligning the hub during assembly. The retaining member 44' has splayed cantilever fingers 46' that extend radially outward from a longitudinal axis of the retaining member 44'. The fingers 46'increase in width as the fingers 46' extend away from the hub 52'. Lower comers 212 of the fingers 46' are rounded. Projections or bumps 214 extend radially outward from the fingers 46' at intermediate locations along the lengths of the fingers 46'. The bumps 214 are engaged by the bottom end of the reset button 48 shaft to facilitate clamping the fingers together for resetting the signal member. In other words, the bumps 214 cause the fingers to be inwardly displaced a greater distance by the reset button that if the bumps were absent. Thus, the distance the reset button must travel to disengage the fingers from the shoulders is shortened.

Figure 14:
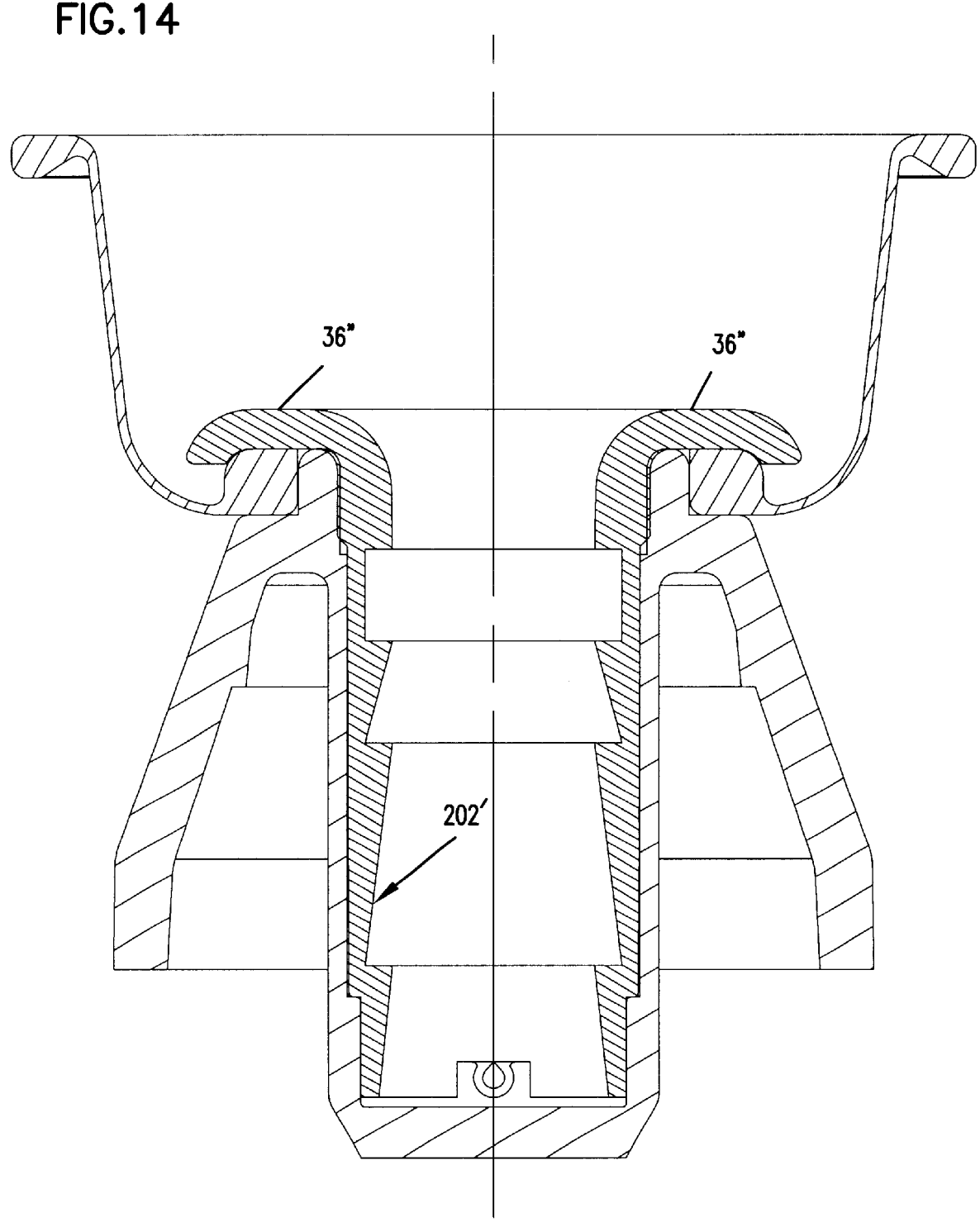
FIG. 14 shows a multi-piece insert having an integral retaining ring structure.

FIGS. 13A–13D show a reset button 48' having a flat 215 for facilitating alignment with the hub 52'of the retaining member 44', and a nose 216 that is tapered. FIG. 14 shows a two-piece insert 202' having a two-piece retaining ring 36" integrally formed therewith.

It will be appreciated that the components can be made from a variety of materials. For example, the reset button 48' can be made of carbon filled nylon (e.g., 30% carbon filled nylon), the fingers 46' can be made of acetal (e.g., Derring® 500 natural), the signal can be made of polycarbonate dyed yellow, the insert 202 can be made of polycarbonate, and the diaphragm can be made of liquid injection molded silicone.

It should be understood that the present invention is not limited to the preferred embodiments discussed above, which are illustrative only. Changes may be made in detail, especially in matters of shape, size, arrangement of parts, or material of components within the principles of the invention, to the full extent indicated by the broad general meanings of the terms in which the appended claims are expressed.

What is claimed is:

1. A restriction indicator for an air cleaner system of an internal combustion engine, the restriction indicator comprising:

a) a housing;

b) a diaphragm dividing the housing into first and second chambers, the first chamber being vented to atmosphere and the second chamber being adapted to be connected in fluid communication with the air cleaner system;

c) a signal member connected to the diaphragm, the signal member being moveable along an axis between a reset position, a first indicator position, and a second indicator position, the signal member defining an axial opening within which first and second retaining shoulders are located, the first retaining shoulder being axially spaced from the second retaining shoulder;

d) a guide member for guiding the signal member as the signal member is moved between the reset position, the first axial position and the second axial position, the guide member defining a guide opening that extends along the axis and is sized to receive at least a portion of the signal member;

e) a retaining member fixed relative to the housing, the retaining member extending within the axial opening of the signal member and including at least two fingers that project radially outward from the axis, the fingers being configured to engage the first retaining shoulder to retain the signal member in the first indicator position and the fingers being configured to engage the second retaining shoulder to retain the signal in the second indicator position; and f) a reset button for deflecting the fingers radially inward to disengage the fingers from the first retaining shoulder thereby allowing the signal member to be returned to the reset position, the reset button including a portion that extends within the axial opening of the signal member between the retaining member and the signal member.

2. The restriction indicator of claim 1, wherein the at least two fingers include three fingers.

3. The restriction indicator of claim 2, wherein the fingers are uniformly spaced about the axis.

4. The restriction indicator of claim 1, wherein the first retaining shoulder is formed about an inner diameter of the signal member.

5. The restriction indicator of claim 4, further comprising a ramp positioned adjacent to the first retaining shoulder.

6. The restriction indicator of claim 5, wherein the ramp is generally frusto-conically shaped.

7. The restriction indicator of claim 1, wherein the retaining member includes a hub connected to the housing and a plurality of retaining legs that project axially outward from the hub, the fingers being connected to the retaining legs.

8. The restriction indicator of claim 7, wherein the reset button includes a hollow shaft defined by a plurality of axial legs separated by axial slots.

9. The restriction indicator of claim 8, wherein the hub defines a plurality of openings, and the axial legs of the reset button extend through the openings.

10. The restriction indicator of claim 8, wherein when the reset button is depressed, the fingers are radially compressed within the hollow shaft.

11. The restriction indicator of claim 10, wherein the axial opening of the signal member is defined by a side wall of the signal member, and wherein the axial legs of the reset button are positioned between the side wall and the retaining legs of the retaining member.

12. The restriction indicator of claim 8, further comprising a button return spring positioned with the hollow shaft and captured between the reset button and the hub.

13. The restriction indicator of claim 1, wherein the reset button includes a hollow shaft mounted over at least a portion of the retaining member, and wherein when the reset button is depressed, the fingers of the retaining member are radially compressed within the hollow shaft.

14. The restriction indicator of claim 13, wherein the axial opening of the signal member is defined by a side wall of the signal member, and wherein the hollow shaft of the reset button is positioned between the side wall and the retaining member.

15. The restriction indicator of claim 1, wherein the signal member is further axially moveable to a third indicator position, and the signal member defines a third retaining shoulder that corresponds to the third indicator position, the third retaining shoulder being positioned within the axial opening of the signal member and being axially spaced from the first and second retaining shoulders.

16. The restriction indicator of claim 1, wherein each of the fingers has a cantilevered configuration, and each of the fingers extends in both axial and radial dimensions relative to the axis.

17. The restriction indicator of claim 1, wherein the first retaining shoulder is defined by an insert piece mounted within the axial opening of the signal member.

18. The restriction indicator of claim 1, wherein the fingers of the retaining member include radially outwardly projecting bumps that are engaged by the portion of the reset button that extends within the axial opening of the signal member.

* * * * *